US012668090B1

(12) United States Patent
Chang et al.

(10) Patent No.: US 12,668,090 B1
(45) Date of Patent: Jun. 30, 2026

(54) SUSPENSION APPARATUS FOR VEHICLES

(71) Applicants:Hyundai Motor Company, Seoul (KR); Kia Corporation, Seoul (KR)

(72) Inventors: Sehyun Chang, Hwaseong-si (KR); Youngil Sohn, Hwaseong-si (KR); Woo Keun Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/240,696

(22) Filed: Jun. 17, 2025

(30) Foreign Application Priority Data

Dec. 30, 2024 (KR) ........................ 10-2024-0199513

(51) Int. Cl.
B60G 17/015 (2006.01)
B60G 11/00 (2006.01)

(52) U.S. Cl.
CPC .......... B60G 17/0152 (2013.01); B60G 11/00 (2013.01); B60G 2202/42 (2013.01); B60G 2204/4191 (2013.01); B60G 2204/45 (2013.01); B60G 2204/62 (2013.01); B60G 2500/104 (2013.01); B60G 2500/30 (2013.01)

(58) Field of Classification Search
CPC B60G 17/0152; B60G 11/00; B60G 2202/42; B60G 2500/30
See application file for complete search history.

(56) References Cited

U.S. PATENT DOCUMENTS

| | | | | |
|---|---|---|---|---|
| 7,665,585 B2 * | 2/2010 | Alexandridis | ..... | B60G 17/0152 248/562 |
| 8,070,169 B2 * | 12/2011 | Kim | ................... | B60G 21/0555 280/5.506 |
| 10,328,762 B2 * | 6/2019 | Park | ..................... | F16F 15/022 |
| 11,285,773 B1 * | 3/2022 | Hall | ....................... | B60G 17/06 |
| 11,376,915 B2 * | 7/2022 | Ohno | ................. | B60G 17/0162 |
| 11,654,967 B2 * | 5/2023 | Ryu | ................... | B60G 17/0165 280/5.51 |
| 12,179,539 B2 * | 12/2024 | Anderson | ............ | B60G 17/015 |
| 12,220,958 B2 * | 2/2025 | Chang | ....................... | B60G 7/04 |
| 12,285,984 B1 * | 4/2025 | Jung | ................... | B60G 17/019 |
| 12,291,067 B2 * | 5/2025 | Di Vittorio | ........ | B60G 17/0157 |
| 12,403,741 B2 * | 9/2025 | Chang | ................. | B60G 17/0165 |
| 2007/0029711 A1 * | 2/2007 | Ehara | ..................... | B60G 17/08 267/64.28 |
| 2018/0250998 A1 * | 9/2018 | Sigmar | ................. | B60K 17/358 |
| 2024/0383297 A1 * | 11/2024 | Doorlag | ............ | B60G 17/0161 |

FOREIGN PATENT DOCUMENTS

| | | |
|---|---|---|
| KR | 20110057667 A | 6/2011 |
| KR | 101339218 B1 | 1/2014 |

* cited by examiner

*Primary Examiner* — Jason D Shanske
*Assistant Examiner* — Tiffany L Webb
(74) *Attorney, Agent, or Firm* — Slater Matsil, LLP

(57) ABSTRACT

A suspension apparatus can include a knuckle configured to be connected to a wheel, an active damper unit configured to connect the knuckle to a body, a first motor configured to apply rotational force to the active damper unit, a first reducer located between the active damper unit and the first motor configured to transmit the rotational force of the first motor to the active damper unit, and a height adjustment unit connected to the first reducer.

20 Claims, 6 Drawing Sheets

SUSPENSION APPARATUS FOR VEHICLES

CROSS-REFERENCE TO RELATED APPLICATIONS

This application claims under 35 U.S.C. § 119(a) the benefit of priority from Korean Patent Application No. 10-2024-0199513 filed on Dec. 30, 2024, the entire contents of which are incorporated herein by reference.

TECHNICAL FIELD

The present disclosure relates to a suspension apparatus for vehicles.

BACKGROUND

When a road surface condition is poor during driving or when a vehicle is driven on a curve, shock is transmitted to the interior space of the vehicle or roll occurs. Suspensions are installed to absorb and alleviate such shock and roll to improve ride comfort and reduce noise introduced into the interior of the vehicle.

Active damper devices that control the motion of the vehicle through active operating force control to improve ride comfort and handling performance of the vehicle are applied.

When the vehicle is driven at a high speed, it is advantageous to lower the body height to reduce air resistance, and when the vehicle is driven on a rough road, it is advantageous to raise the body height to prevent damage to the lower part of the vehicle body.

Therefore, there is a need for a vehicle height adjustment device capable of variably adjusting the body height of a vehicle to respond to various driving environments.

In the past, separate active damper devices and vehicle height adjustment devices have been applied simultaneously to maximize vehicle performance, and there were problems in terms of manufacturing costs and vehicle packaging.

Accordingly, a suspension apparatus having a new structure that may solve the above-described problems and be easily applied is required.

The above information disclosed in this Background section is only for enhancement of understanding of the background of the present disclosure and therefore it may contain information that does not form the prior art that is already publicly known, available, or in use.

SUMMARY

The present disclosure relates to a suspension apparatus for vehicles. More particularly, the present disclosure relates to a suspension apparatus that can include an active damper unit capable of actively varying vertical operating force and a vehicle height adjustment unit capable of adjusting the height of a vehicle to improve ride comfort and handing performance of the vehicle.

An embodiment of the present disclosure can solve the above-described problems associated with prior art. An embodiment of the present disclosure can provide a suspension apparatus that may control an active damper unit and a vehicle height adjustment unit through a single power source.

An embodiment of the present disclosure can provide a suspension apparatus that can include a clutch capable of performing a self-locking function in a state in which a vehicle height has been adjusted through a lower spring seat.

The advantages of an embodiment of the present disclosure are not limited to the above-mentioned advantages, and other advantages not mentioned herein can be understood by those skilled in the art from the following description and can be more clearly understood from example embodiments of the present disclosure. The advantages of an embodiment of the present disclosure may be realized by use of elements, components, and combinations thereof disclosed in the claims.

A suspension apparatus for achieving the above-described advantages in accordance with an embodiment of the present disclosure can include the following configuration.

In an embodiment of the present disclosure, a suspension apparatus can include a knuckle connected to a wheel of a vehicle, an active damper unit configured to connect the knuckle to a vehicle body, a first motor configured to apply rotational force to the active damper unit, a first reducer located between the active damper unit and the first motor to transmit the rotational force of the first motor to the active damper unit, and a vehicle height adjustment unit connected to the first reducer.

In an embodiment, the first reducer may be a planetary gear set.

In an embodiment, the active damper unit may include a rod having one end fixed to the vehicle body, a first ball nut provided at a remaining end of the rod, a first ball screw connected to the first ball nut and configured to receive the rotational force of the first motor, and a case fixed to the knuckle and configured to support the rod and the first ball screw while surrounding the rod and at least a part of the first ball screw so as to be rotatable relative to the rod and the first ball screw.

In an embodiment, the rod may have a space formed therein so that a part of the first ball screw is located in the space.

In an embodiment, the suspension apparatus may further include a rebound stopper provided within the case to restrict upward movement of the rod in a height direction of the vehicle, and a bump stopper provided within the case to restrict downward movement of the rod in the height direction of the vehicle.

In an embodiment, the suspension apparatus may further include a second reducer connected to a carrier of the planetary gear set to transmit the rotational force of the first motor to the first ball screw.

In an embodiment, an output shaft of the first motor may be connected to a sun gear of the planetary gear set.

In an embodiment, the suspension apparatus may further include a first damper connected to the sun gear of the planetary gear set by penetrating the first motor.

In an embodiment, the vehicle height adjustment unit may include a torsion bar having one end connected to a ring gear of the planetary gear set, a clutch or latch solenoid connected to a remaining end of the torsion bar, a third reducer connected to the clutch or latch solenoid, a second ball screw connected to the third reducer and supported by the active damper unit so as to be rotatable with respect to the active damper unit and restrained in a vertical direction, a second ball nut connected to the second ball screw, a lower spring seat fixed to the second ball nut, an upper spring seat fixed to the vehicle body, and a spring provided between the lower spring seat and the upper spring seat.

In an embodiment, the clutch or latch solenoid may selectively connect the remaining end of the torsion bar to the third reducer, or fix the remaining end of the torsion bar.

In an embodiment, the clutch may connect the remaining end of the torsion bar to the third reducer only if torque of the torsion bar due to the rotational force of the first motor is greater than torque transmitted to the third reducer by a load of the spring.

In an embodiment, the clutch may fix the remaining end of the torsion bar if torque of the torsion bar due to the rotational force of the first motor is smaller than torque transmitted to the third reducer by a load of the spring.

In an embodiment, if the clutch connects the remaining end of the torsion bar to the third reducer so that the second ball screw is rotated, the lower spring seat may be moved in an upward direction of the vehicle.

In an embodiment, the suspension apparatus may further include a housing fixed to the case to rotatably support the planetary gear set and the second reducer.

In an embodiment, an upper end of the torsion bar may be rotatably supported by the active damper unit, and the clutch or latch solenoid and the first motor may be fixed to the active damper unit.

In an embodiment, the ring gear of the planetary gear set and the one end of the torsion bar may be connected by a belt.

In an embodiment, the suspension apparatus may further include a fourth reducer connected to the first ball nut and a second damper or second motor connected to the fourth reducer.

BRIEF DESCRIPTION OF THE DRAWINGS

The above and other features of example embodiments of the present disclosure will now be described in detail with reference to and illustrated in the accompanying drawings, which are given hereinbelow by way of illustration, and thus are not necessarily limitative of the present disclosure, and wherein.

Figure 1:
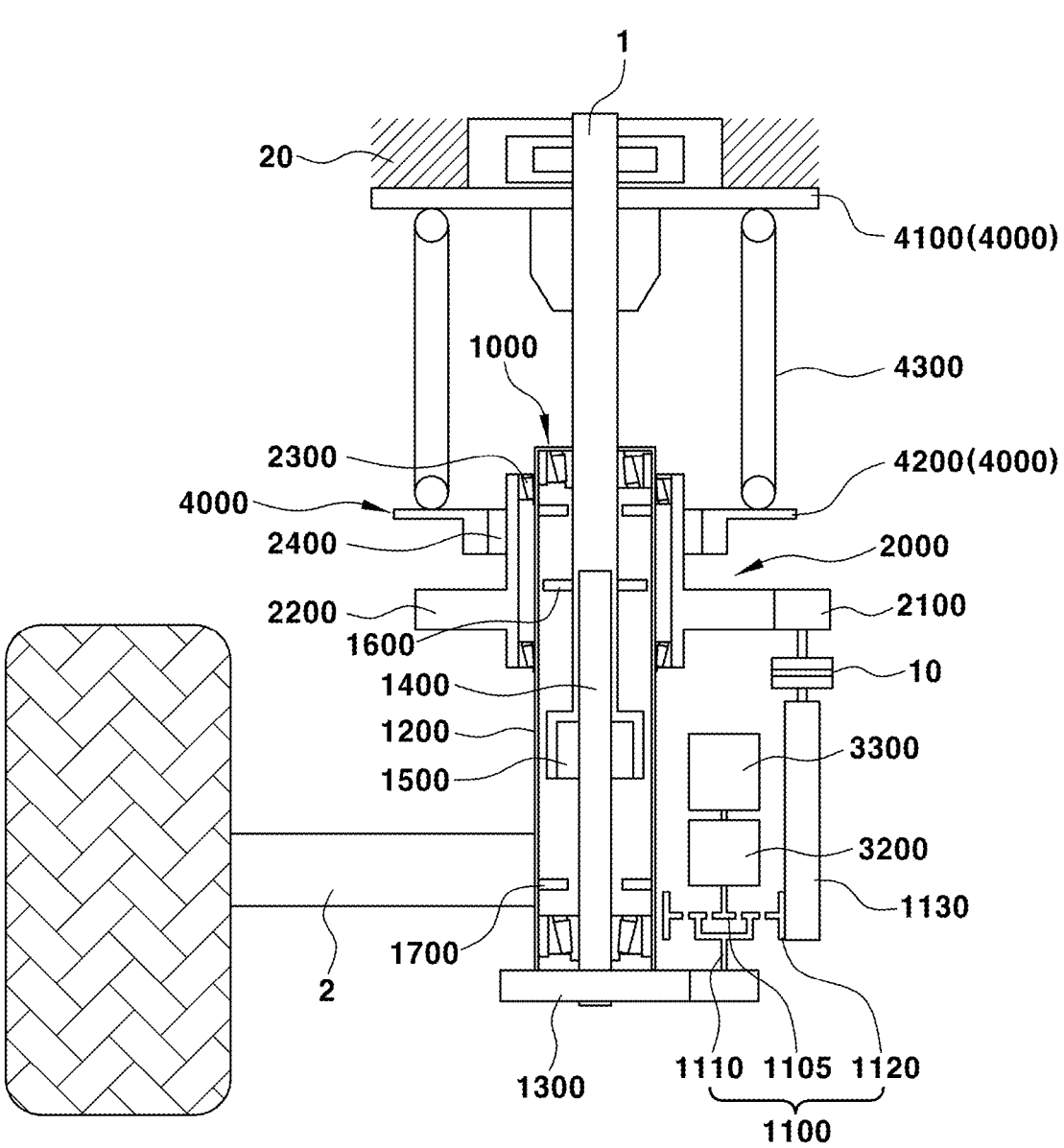
FIG. 1 is a cross-sectional view of a suspension apparatus according to an embodiment of the present disclosure.

It can be understood that the appended drawings are not necessarily to scale, can be presenting a somewhat simplified representation of various preferred features illustrative of the basic principles of the disclosure. The specific design features of embodiments of the present disclosure as disclosed herein, including, for example, specific dimensions, orientations, locations, and shapes can be determined in part by a particular intended application and use environment.

In the figures, reference numbers can refer to same or equivalent parts of embodiments of the present disclosure throughout the several figures of the drawing.

DETAILED DESCRIPTION OF ILLUSTRATIVE EMBODIMENTS

Hereinafter, reference will be made in detail to various example embodiments of the present disclosure, which are illustrated in the accompanying drawings and described below. The present disclosure is not necessarily limited to the following example embodiments, and embodiments may be implemented in various different forms. The example embodiments are provided to make the description of the present disclosure thorough and to fully convey the scopes of the present disclosure to those skilled in the art.

In the following description of the example embodiments, it can be understood that the terms " . . . part," " . . . unit," " . . . module," etc. can indicate units for processing at least one function or operation, and may be implemented as software, hardware, or a combination of software and hardware, for example.

Terminology used herein is for the purpose of describing particular example embodiments and is not necessarily intended to be necessarily limiting. As used herein, singular expressions may be intended to include plural expressions as well, unless the context clearly indicates otherwise.

In the following description of the present disclosure, names of components can be divided into prefixes "input . . . ," "outer . . . ," etc. to distinguish the components from each other because the names of the components can be otherwise the same, and these prefixes do not necessarily imply a sequence or order unless clearly indicated by the context.

Hereinafter, example embodiments will be described in detail with reference to the accompanying drawings, and when describing with reference to the accompanying drawings, same reference numerals can be assigned to identical or corresponding components, and a redundant description thereof can be omitted.

"Back drive" in the description can have a same meaning as "backlash", and back drive can refer to a state in which an input shaft is moved in the opposite direction to a direction in which it is rotated without driving force applied thereto.

FIG. 1 is a cross-sectional view of a suspension apparatus according to an embodiment of the present disclosure, which can include: a rod 1 located on a vehicle body 20; an active damper unit 1000 configured to surround the rod 1; and a vehicle height adjustment unit 2000 that independently controls the height of a lower spring seat 4200 based on the active damper unit 1000.

The active damper unit 1000 can be moved up and down with respect to the rod 1. The active damper unit can include a case 1200, a first ball nut 1500 fixedly positioned on the rod 1, and a first ball screw 1400 coupled to the first ball nut 1500 and rotated by receiving driving force from a driving unit on the lower surface of the case 1200. A spring seat unit 4000 can be located outside the case 1200 so as to be moved integrally with the case 1200. The rod 1 may include an inner space in which at least a part of the first ball screw 1400 is located, and the first ball nut 1500 may be moved along the first ball screw 1400 up and down along the rod 1.

As shown in FIG. 1, the rod 1 can be located on the vehicle body 20, and at least a part of the rod 1 can be coupled to the active damper unit 1000. The lower end of the active damper unit 1000 can be coupled to the driving unit so that rotational force from a first motor 3200 of the driving unit can be applied to the first ball screw 1400 of the active damper unit 1000. The active damper unit 1000 and the driving unit can be gear-coupled through a second reducer 1300, and the rotational force of the first motor 3200 of the driving unit can be applied to the first ball screw 1400 of the active damper unit 1000. The first ball screw 1400 can be located in the case 1200 and coupled to the first ball nut 1500 fixed to the rod 1, and the case 1200 can be moved up and down along the rod 1 in response to the rotational force of the first ball screw 1400.

The second reducer 1300 can be configured to be connected to a carrier 1110 of a planetary gear set so as to transmit the rotational force of the first motor 3200 to the first ball screw 1400. A housing 3100 can be configured to surround the second reducer 1300 (see, e.g., FIG. 3) and the planetary gear set integrally may be provided so that the planetary gear set and the second reducer 1300 are mutually rotatably coupled.

The first ball screw 1400 can be configured such that screw threads are formed along the outer circumferential surface thereof, the first ball nut 1500 can be configured such that screw grooves corresponding to the screw threads are formed in the inner circumferential surface thereof, and thus, the first ball screw 1400 and the first ball nut 1500 can be moved relative to each other.

A knuckle 2 to which a wheel can be coupled can be provided at one side of the case 1200. The driving unit may be located at the other side of the case 1200 including the knuckle 2 so as to be fixed to the case 1200.

A rebound stopper 1600 that restricts the upward movement of the active damper unit 1000 in the height direction may be located at the upper end of the inside of the case 1200, and a bump stopper 1700 that restricts the downward movement of the active damper unit 1000 in the height direction may be located at the lower end of the inside of the case 1200.

The driving unit can include: the housing 3100 coupled to the side surface of the case 1200; the first motor 3200 located on the housing 3100; and a first reducer 1100 configured such that the output shaft of the first motor 3200 is inserted thereinto. The first reducer 1100 can include the planetary gear set, the output shaft of the first motor 3200 can be coupled to a sun gear 1105, the output of the sun gear 1105 can be transmitted to the carrier 1110 of the first reducer 1100, and a ring gear 1120 can be rotated along the outer circumferential surface of the carrier 1110 and can be coupled to a torsion bar 1130 located on the side surface of the case 1200. The first reducer 1100 can be coupled to the second reducer 1300 to apply driving force to the active damper unit 1000. Because the ring gear 1120 can be coupled to the torsion bar 1130 by a belt 1140 (see, e.g., FIGS. 2 and 4), the carrier 1110 can be rotated by rotation of the first motor 3200, and when the carrier 1110 is rotated, reaction force applied to the ring gear 1120 can be applied to the torsion bar 1130. A first damper 3300 may be coupled to the central shaft of the first motor 3200 of the driving unit. For example, the first damper 3300 may be connected to the sun gear 1105 of the planetary gear set. According to an embodiment of the present disclosure, the first damper 3300 may be a rotary damper or a servomotor, and may absorb vibration and noise caused by rotation of the first motor 3200.

Figure 3:
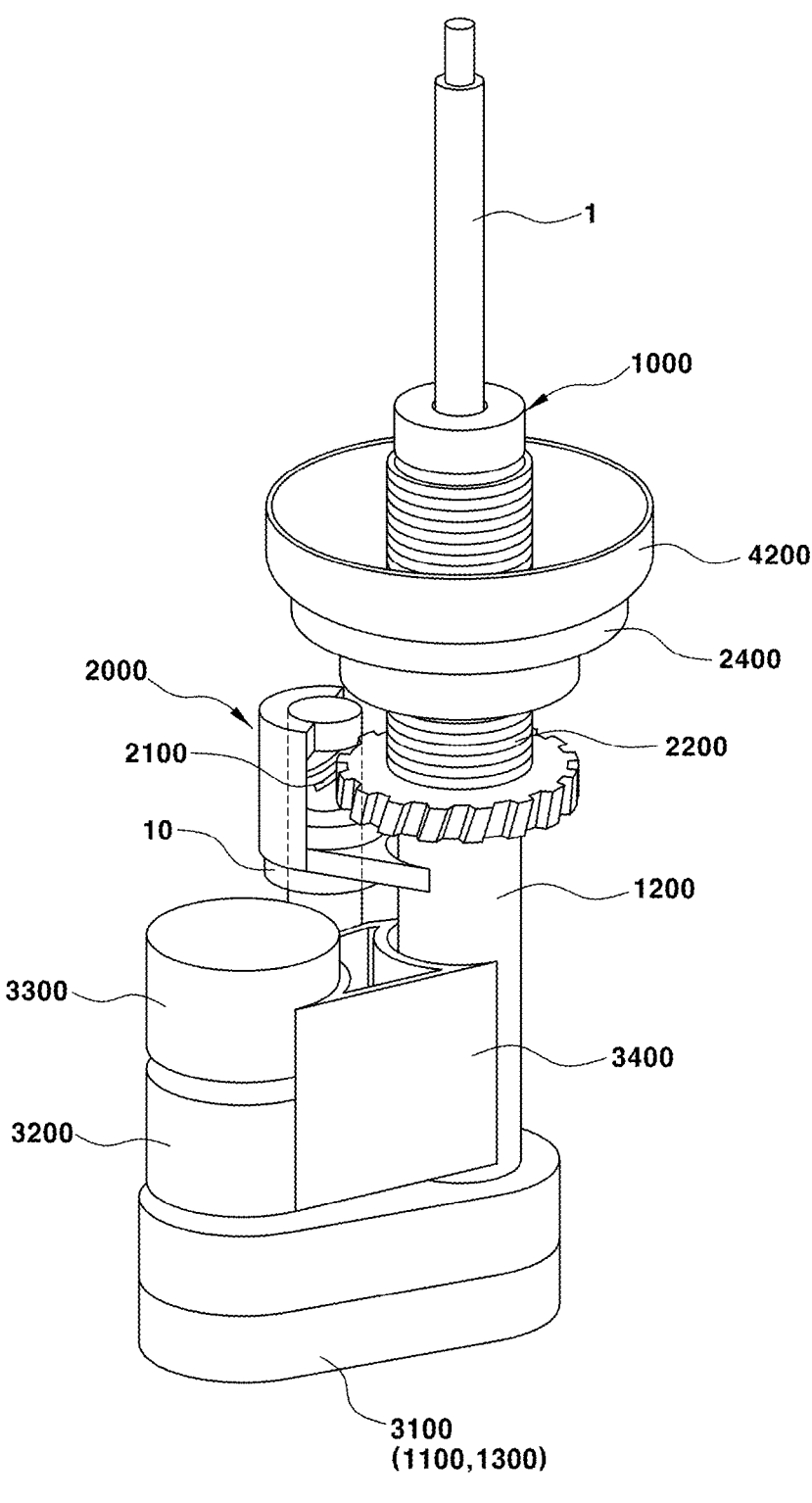
FIG. 3 is a perspective view showing a connection relationship between a vehicle height adjustment unit and an active damper unit according to an embodiment of the present disclosure.

The housing 3100 of the driving unit and the case 1200 of the active damper unit 1000 can be positioned at the lower end of the case 1200 of the active damper unit 1000 by a connection member 3400 so as to be movable integrally (see, e.g., FIG. 3). The connection member 3400 may be configured to have a material property capable of absorbing vibration of the driving unit.

The first ball screw 1400 can be coupled to the first reducer 1100 of the driving unit through the second reducer 1300. The carrier 1110 of the first reducer 1100 and the second reducer 1300 can be coupled so that the rotational force of the first motor 3200 can be applied to the first ball screw 1400. The first ball nut 1500 can be fixed to the rod 1 and can be configured such that, when the rotational force of the first motor 3200 is applied, the first ball screw 1400 can be moved along the first ball nut 1500, and thereby, the first ball screw 1400 and the case 1200 can be integrally moved up and down along the rod 1. The driving unit located at the lower end of the case 1200 may be moved integrally with the case 1200.

The spring seat unit 4000 can be moved integrally with the case 1200 on the outer surface of the case 1200. The spring seat unit 4000 can include a second ball screw 2200 located on the case 1200 so as to be rotatable with respect to the case 1200. The second ball screw 2200 can be coupled to a third reducer 2100 and can move a second ball nut 2400 and the spring seat unit 4000 integrally with respect to the case 1200 in response to rotational force applied to the torsion bar 1130. The spring seat unit 4000 can include an upper spring seat 4100 located on the vehicle body 20, the lower spring seat 4200 formed integrally with the second ball unit 2400, and a spring 4300 located between the upper spring seat 4100 and the lower spring seat 4200.

The third reducer 2100 can be coupled to the torsion bar 1130 via a clutch or latch solenoid 10 and can rotate the second ball screw 2200 depending on the rotational force applied to the torsion bar 1130. The second ball nut 2400 can be coupled to the second ball screw 2200 and restrained in the height direction by the outer circumferential surface of the case 1200, and the second ball nut 2400 can be provided integrally with the lower spring seat 4200.

Therefore, the height of the second ball nut 2400 and the lower spring seat 4200 may be independently adjusted with respect to the case 1200 in response to rotational force applied to the second ball screw 2200. According to an embodiment of the present disclosure, the clutch or latch solenoid 10 may include a 2-way clutch or latch solenoid 10 configured to allow only rotational force applied from the torsion bar 1130 to the second ball screw 2200 to be transmitted. That is, the clutch or latch solenoid 10 can include all components that may perform self-locking of the third reducer 2100 and the lower spring seat 4200 by fixing rotation of the third reducer 2100 coupled to the lower spring seat 4200 in a state in which driving of the first motor 3200 is stopped. Therefore, the other end of the torsion bar 1130 can be connected to the clutch or latch solenoid 10 and may be selectively connected to the third reducer 2100, or self-locked to be fixed.

For example, the torsion bar 1130 may be coupled to an input shaft 200 of the clutch 10 (see, e.g., FIG. 6), and rotational force may be transmitted to the second ball screw 2200 through the third reducer 2100 coupled to an outer shaft 300 of the clutch 10. On the other hand, if rotational force is applied to the third reducer 2100 by external force from the second ball screw 2200, the outer shaft 300 is locked within a clutch housing 100 so that the rotational force is not transmitted to the input shaft 200. That is, the clutch 10 can be configured to transmit rotational force to the third reducer 2100 in response to the rotation of the torsion bar 1130, and, if rotational force is applied to the third reducer 2100, not to transmit the rotational force to the torsion bar 1130 through the clutch 10, thereby being capable of performing self-locking of the vehicle height adjustment unit 2000. Thereby, even if the driving force of the first motor 3200 is not transmitted, the height of the lower spring seat 4200, which can be adjusted based on the case 1200, may be maintained.

The clutch 10 can be configured to connect the other end of the torsion bar 1130 to the third reducer 2100 only if the torque of the torsion bar 1130 due to the rotational force of the first motor 3200 is greater than the torque transmitted to the third reducer 2100 by the load of the spring 4300 applied through the lower spring seat 4200. The clutch 10 can be configured such that, if the torque of the input shaft 200 of the clutch 10 is greater than the torque of the outer shaft 300, the rotational force of the input shaft 200 is transmitted to rotate the outer shaft 300 through rotation transmission parts 210.

On the contrary, the clutch 10 can be controlled to fix the other end of the torsion bar 1130 if the torque of the torsion bar 1130 due to the rotational force of the first motor 3200 is smaller than the torque transmitted to the third reducer 2100 by the load of the spring 4300 applied through the lower spring seat 4200. The clutch 10 can be configured such that, if the torque of the outer shaft 300 is greater than the torque of the input shaft 200, a braking part 510 located on the inner circumferential surface of the housing 100 and the outer circumferential surfaces of lockers 400 can come into contact with each other to be fixed. Therefore, the rotational force of the outer shaft 300 may be prevented from being transmitted to the input shaft 200.

That is, depending on the magnitudes of torques applied to the torsion bar 1130 and the spring 4300, transmission of the load of the spring 4300 to the third reducer 2100 may be controlled through the clutch 10.

In comparison, the active damper unit 1000 can be configured such that the case 1200 is moved in the length direction of the rod 1 if the driving force of the first motor 3200 is applied, and can be configured to be restored to a force equilibrium state by the elastic force of the spring 4300 of the spring seat unit 4000 in a state in which the driving force of the first motor 3200 is blocked. That is, if the active damper unit 1000 is switched to the equilibrium state between the elastic force of the spring 4300 and the load of the vehicle in the state in which the driving force of the first motor 3200 is blocked, the active damper unit 1000 can be switched to a height corresponding to the equilibrium state, and the lower spring seat 4200, whose height can be adjusted through the vehicle height adjustment unit 2000, can be locked so that the position thereof is fixed.

Figure 2:
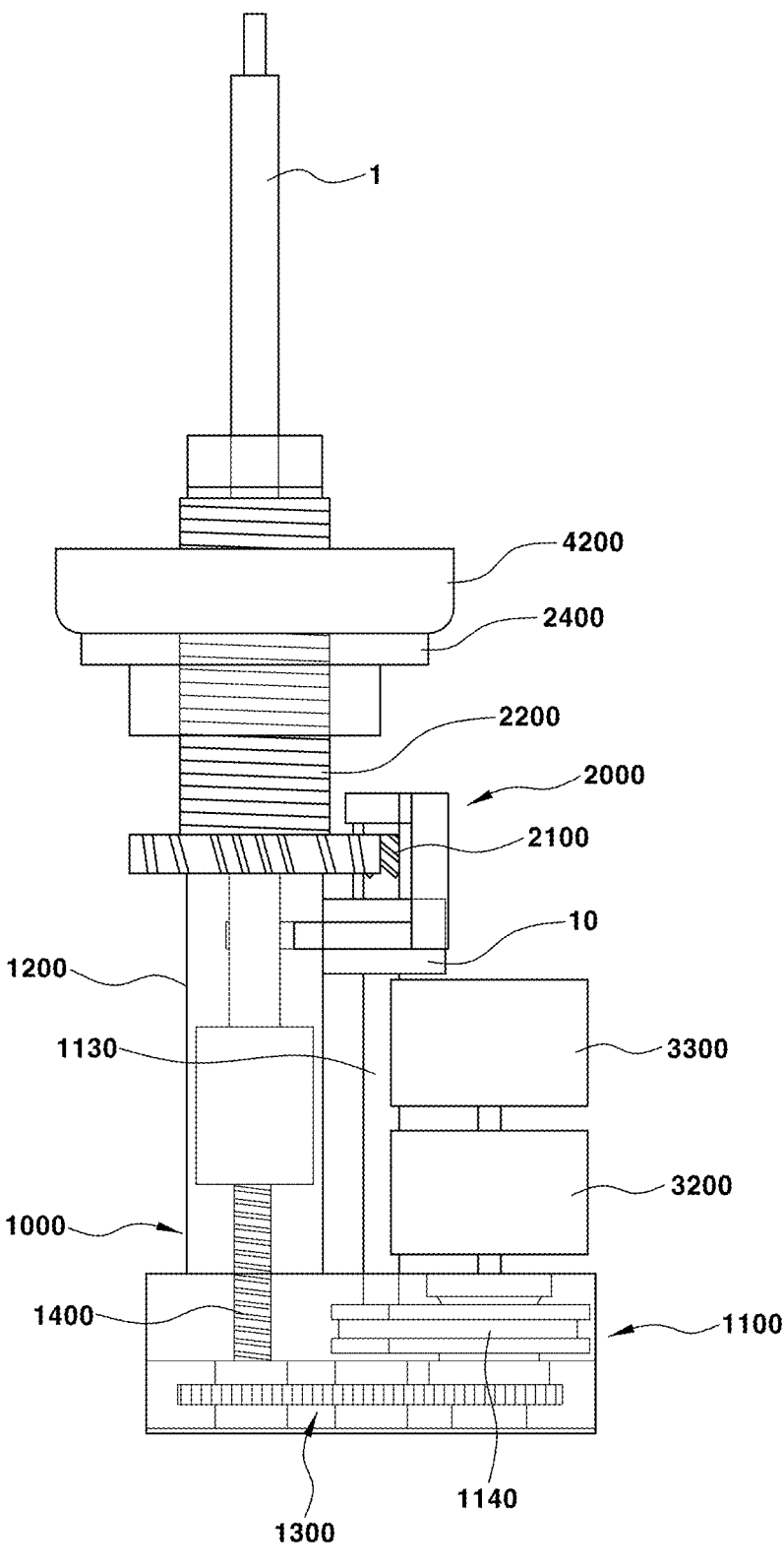
FIG. 2 is a side view showing a configuration of a suspension apparatus according to an embodiment of the present disclosure.

FIG. 2 illustrates the driving operation of the active damper unit 1000 according to an embodiment of the present disclosure.

Power from a battery (not shown) located in the vehicle can be applied to the first motor 3200 of the driving unit located outside the case 1200, and the output shaft of the first motor 3200 coupled to the carrier 1110 of the first reducer 1100 can be rotated. The second reducer 1300 connected to the carrier 1110 of the first reducer 1100 can rotate the first ball screw 1400 of the active damper unit 1000. The first ball screw 1400 can be coupled to the first ball nut 1500 provided integrally with the rod 1 within the case 1200, and the first ball screw 1400 can be moved up and down along the rod 1 integrally with the case 1200 in response to the rotation amount of the first ball screw 1400.

The case 1200 can be located so that the movement thereof in the height direction is restrained by the lower spring seat 4200 and the second ball nut 2400, and the lower spring seat 4200 and the second ball nut 2400 may be moved integrally in response to the movement of the case 1200.

The housing 3100 can be fixed to the lower end of the case 1200 and can be configured to surround the second reducer 1300 and at least a part of the driving unit, and the case 1200 and the housing 3100 may be moved integrally with the rotation of the first ball screw 1400.

That is, if the case 1200 of the active damper unit 1000 is moved up and down along the rod 1, the driving unit and the second reducer 1300 can be moved integrally with the movement of the case 1200. The driving unit and the case 1200 can be coupled to each other through the connection member 3400 located at the upper end of the housing 3100. The connection member 3400 may absorb vibration generated when the driving unit is driven, and absorb shock of the driving unit moved integrally with the case 1200.

The active damper unit 1000 may be moved up and down with respect to the rod 1 and thus guide the movement of the spring seat unit 4000, which can be provided integrally with the active damper unit 1000, in the height direction, and the active damper unit 1000 may have a coupling relationship with the driving unit so that the driving unit, which can provide driving force to the active damper unit 1000, may be moved integrally with the active damper unit 1000.

In comparison, FIG. 3 illustrates a driving operation of the vehicle height adjustment unit 2000 according to an embodiment of the present disclosure.

Referring to FIGS. 1 and 3, the first motor 3200 of the driving unit can be configured to be rotated to provide driving force to change the height of the active damper unit 1000. The output shaft of the first motor 3200 can be coupled to the carrier 1110 of the first reducer 1100 and apply rotational force to the second reducer 1300 through the carrier 1110. The ring gear 1120 can be configured to surround the carrier 1110 and can be coupled to the torsion bar 1130 located outside the ring gear 1120. The ring gear 1120 can receive reaction force applied in response to the rotation of the carrier 1110, and transmit the received reaction force to the torsion bar 1130 to provide rotational force to the torsion bar 1130. For example, the ring gear 1120 of the first reducer 1100 and the torsion bar 1130 may be coupled to each other by the belt 1140 (see, e.g., FIG. 4). The belt 1140 may include any component capable of transmitting rotational force, such as a belt or a chain.

The reaction force applied from the torsion bar 1130 can be transmitted to the third reducer 2100 via the clutch 10. The third reducer 2100 can include spur gears or bevel gears, and can be connected to the second ball screw 2200. Therefore, the rotational force of the torsion bar 1130 coupled to the input shaft 200 of the clutch 10 can be applied to the third reducer 2100 coupled to the outer shaft 300 of the clutch 10, and the third reducer 2100 can apply the rotational force to the second ball screw 2200. The second ball screw 2200 can be located on the outer circumferential surface of the case 1200, and the movement of the second ball screw 2200 can be restrained by the case 1200. That is, if the case 1200 can be moved depending on driving of the active damper unit 1000, the second ball crew 2200, the second ball nut 2400, and the lower spring seat 4200 may be moved integrally with the case 1200.

Furthermore, the second ball screw 2200 may be provided to be independently rotatable with respect to the outer circumferential surface of the case 1200. That is, the movement of the second ball screw 2200 in the height direction can be restrained by the case 1200, but the second ball screw 2200 can be freely rotatable with respect to the case 1200 depending on the rotational force of the third reducer 2100 in response to the configuration of ball bearings 2300 located on the inner circumferential surface of the second ball screw 2200.

In response to the rotation of the second ball screw 2200, the second ball nut 2400 can be rotated integrally with the lower spring seat 4200, and the height of the lower spring seat 4200 may be adjusted independently of the active damper unit 1000. Therefore, the height of the case 1200 relative to the rod 1 may be adjusted through the active damper unit 1000, and simultaneously, the height of the lower spring seat 4200 may be additionally adjusted with respect to the case 1200 through the vehicle height adjustment unit 2000.

In summary, in response to driving of the first motor 3200, the active damper unit 1000 may adjust the height of the case 1200 relative to the rod 1, and simultaneously, the vehicle height adjustment unit 2000 may adjust the relative position of the lower spring seat 4200 located on the case 1200 to adjust a height from the vehicle body 20 to the knuckle 2.

However, under the condition that the first motor 3200 is not driven, the active damper unit 1000 switches the position of the case 1200 in response to the equilibrium state between the spring 4300 and the load of the vehicle, but the vehicle height adjustment unit 2000 may perform the function of locking the clutch 10 to maintain the position of the lower spring seat 4200 relative to the case 1200.

Figure 4:
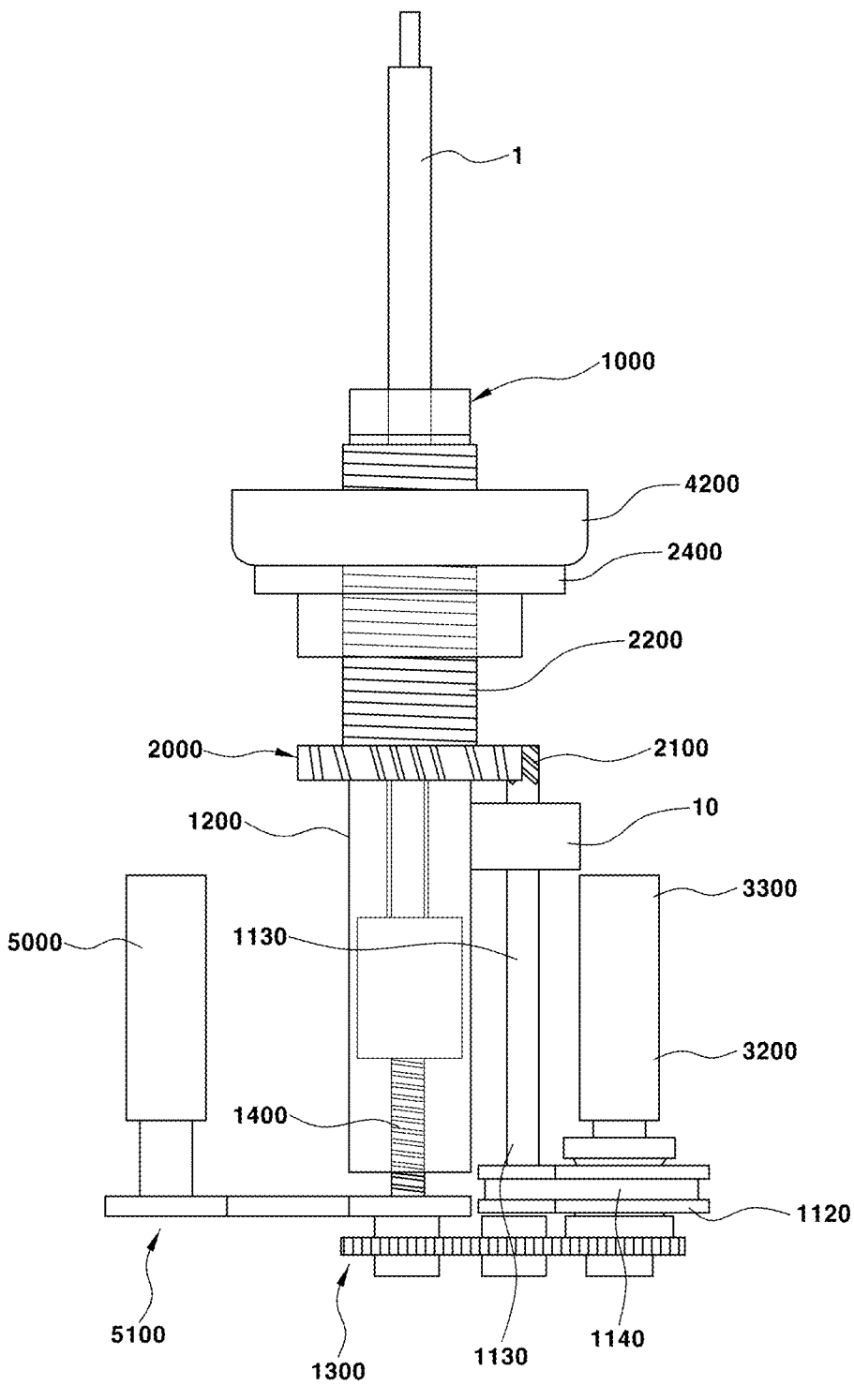
FIG. 4 is a side view showing a configuration of a second damper connected to a rod of the active damper unit according to an embodiment of the present disclosure.

FIG. 4 shows a second damper (second motor) 5000 that can be provided at a position opposite to a driving unit with respect to a case 1200 according to an embodiment of the present disclosure.

In an embodiment of the present disclosure, an active damper unit 1000 and a vehicle height adjustment unit 2000 can include the same configuration as in the above embodiment of FIGS. 1 to 3. That is, the active damper unit 1000 can be moved up and down with respect to the rod 1. The active damper unit 1000 can include the case 1200, a first ball nut 1500 located to be fixed to the rod 1, and a first ball screw 1400 coupled to the first ball nut 1500 and rotated on the lower surface of the case 1200 by receiving driving force applied from the driving unit. A spring seat unit 4000 can be located outside the case 1200 to be moved integrally with the case 1200.

The rod 1 can be located on a vehicle body 20, and at least a part of the rod 1 can be coupled to the active damper unit 1000. The lower end of the active damper unit 1000 can be coupled to the driving unit so that rotational force from a first motor 3200 of the driving unit can be applied to the active damper unit 1000. The active damper unit 1000 and the driving unit can be gear-coupled through a second reducer 1300, and the rotational force of the first motor 3200 of the driving unit can be applied to the first ball screw 1400 of the active damper unit 1000. The first ball screw 1400 can be coupled to the first ball nut 1500 fixed to the rod 1, and the first ball screw 1400 can be moved up and down along the first ball nut 1500 integrally with the case 1200 in response to the rotational force of the first ball screw 1400. A knuckle 2 to which a wheel can be coupled can be provided at one side of the case 1200. The driving unit may be located at the other side of the case 1200 including the knuckle 2 so as to be fixed to the case 1200.

The first ball screw 1400 can be coupled to a first reducer 1100 of the driving unit through the second reducer 1300. The second reducer 1300 can be coupled to a carrier 1110 of the first reducer 1100 so that the rotational force of the first motor 3200 can be transmitted to the first ball screw 1400. If the first ball screw 1400 is rotated with respect to the first ball nut 1500, the first ball screw 1400 can be moved up and down along the rod 1 integrally with the case 1200. The driving unit located at the lower end of the case 1200 may be moved integrally with the case 1200.

Referring to FIG. 4, the second damper (second motor) 5000 can be configured to be coupled to the rotating shaft of the first ball screw 1400 through a fourth reducer 5100 located between the second damper (second motor) 5000 and the rotating shaft of the first ball screw 1400. Because the second damper (second motor) 5000 can be provided at a position facing the driving unit, the fourth reducer 5100 and the second reducer 1300 coupled to the axis of rotation of the first ball screw 1400 may be located to face each other. The second damper (second motor) 5000 can be configured to have a shape facing the first ball screw 1400, and the position of the second damper (second motor) 5000 may be changed depending on the configuration and coupling relationship thereof.

In an embodiment of the present disclosure, the second damper (second motor) 5000 may include a rotary damper, an MR fluid damper, or a servomotor, for example. In an embodiment of the present disclosure including a servomotor as the second damper (second motor) 5000, rotational force applied to the first ball screw 1400 may be applied not only from the first motor 3200 of the driving unit but also from the servomotor as the second damper (second motor) 5000. Therefore, the active damper unit 1000 may receive rotational force from two driving sources, and when no driving force is applied and the active damper unit 1000 can be restored to an original state thereof in the equilibrium state between the spring 4300 and the load of the vehicle body 20, the restoration speed may be controlled. The first damper 3300 and the second damper (second motor) 5000 may perform the function of noise and vibration generated when the active damper unit 1000 is driven or restored to the original state thereof.

Figure 5:
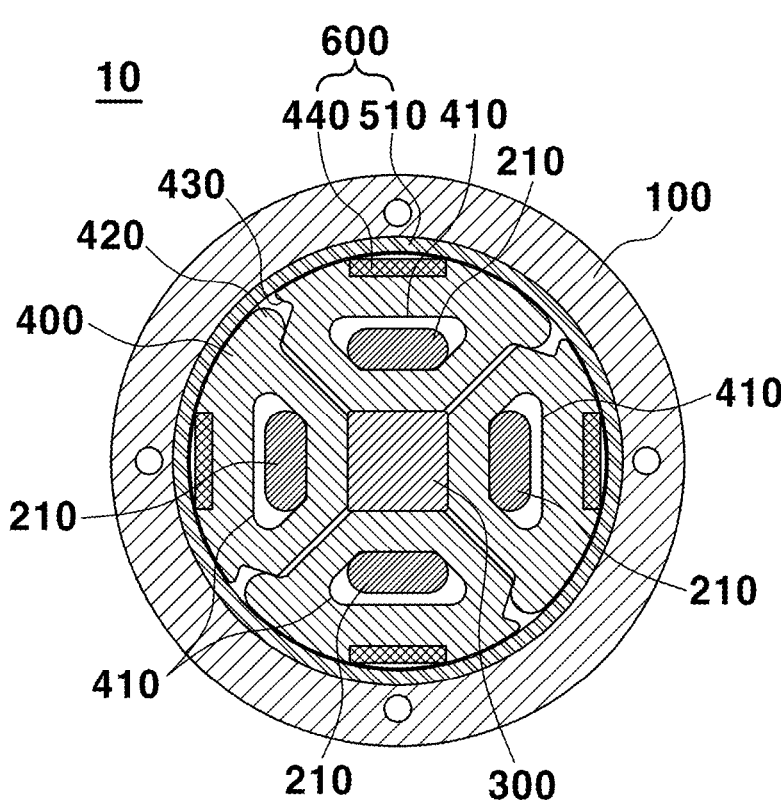
FIG. 5 is a front view of a clutch of the suspension apparatus according to an embodiment of the present disclosure.
Figure 6:
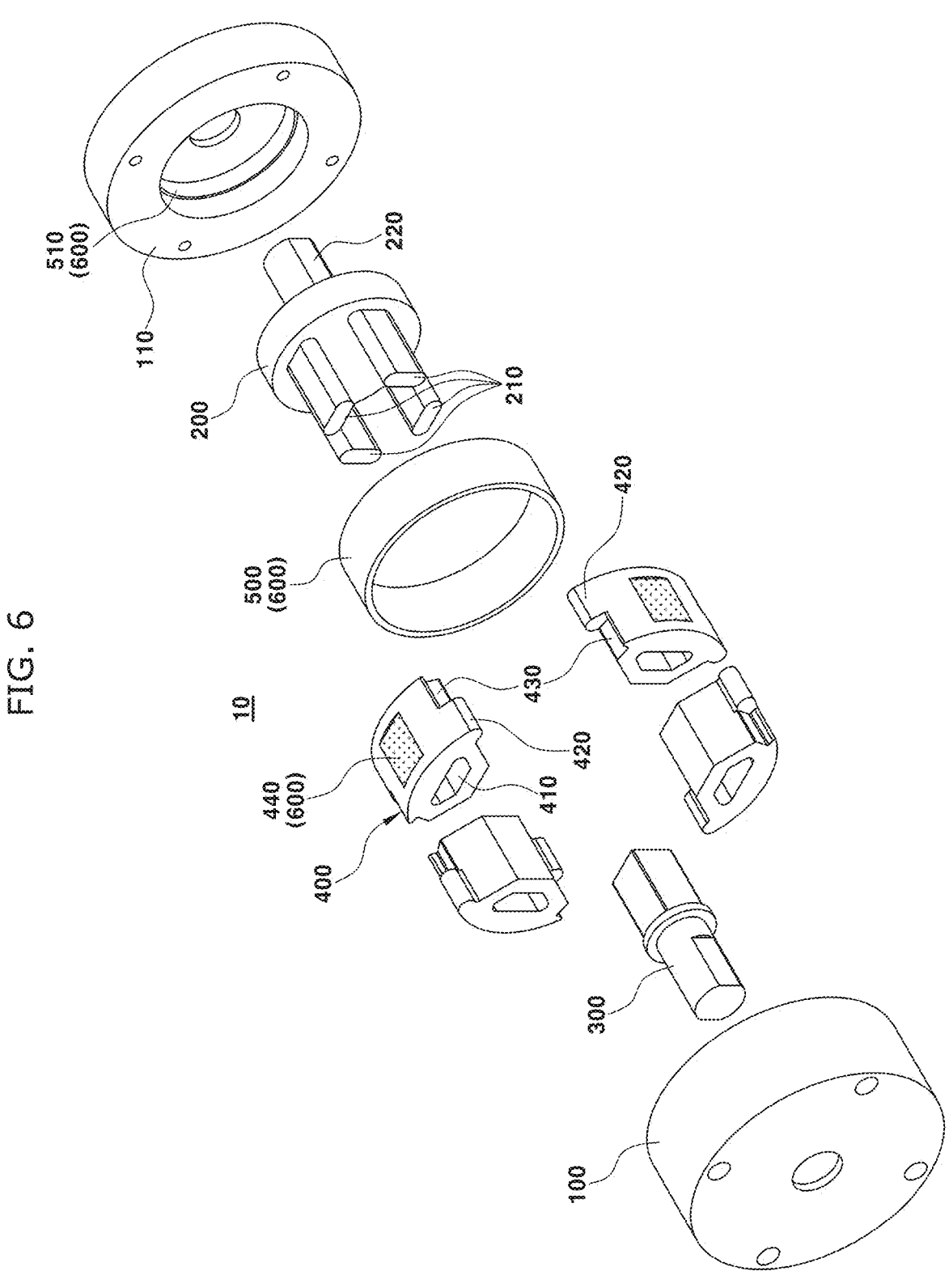
FIG. 6 is an exploded perspective view showing a configuration of a clutch of a suspension apparatus according to an embodiment of the present disclosure.

FIGS. 5 and 6 illustrate a configuration of a clutch 10 according to an embodiment of the present disclosure.

As illustrated in FIGS. 5 and 6, the clutch 10 can include a clutch housing 100, and a cover 11o provided at one end, i.e., an open end, of the clutch housing 100 to surround the open end of the clutch housing 100. The clutch housing 100 can be configured to have a circular cross-section, and the cover no can be configured to surround the entirety of the open end of the clutch housing 100.

The clutch 10 can include the outer shaft 300 that penetrates the other end of the clutch housing 100 and forms at least one flat surface. The outer shaft 300 can be connected to the vehicle height adjustment unit 2000 and can serve to transmit rotational force applied to the input shaft 200 through the torsion bar 1130 to the vehicle height adjustment unit 2000.

The clutch 10 can include a plurality of lockers 400 provided within the clutch housing 100 to surround the at least one flat surface of the outer shaft 300. The input shaft 200 can include ends (e.g., rotation transmission parts 210) inserted into openings 410 formed in each of the lockers 400. The outer shaft 300 can be configured to have flat surfaces corresponding to the number of the lockers 400 located in the clutch housing 100. For example, the outer shaft 300 according to an embodiment of the present disclosure may be configured to have four flat surfaces corresponding to four lockers 400. The flat surfaces of the outer shaft 300 may be configured to come into contact with the adjacent lockers 400 when the rotational force is applied from the input shaft 200, and the lockers 400 and the outer shaft 300 may be configured to selectively come into surface contact with each other.

The input shaft 200 can be coupled to the torsion bar 1130 and can be configured such that at least a part of the input shaft 200 in the longitudinal direction (e.g., including rotation transmission parts 210) is inserted into the openings 410 formed in each of the lockers 400, and the other end of the input shaft 200 may include a drive transmission part 220 that penetrates the cover 11o and protrudes outward from the cover 11o. The drive transmission part 220 can be coupled to the torsion bar 1130 that applies rotational force, and can be rotated integrally with the torsion bar 1130 in the rotating direction of the torsion bar 1130. Alternatively, the drive transmission part 220 may be provided integrally with the torsion bar 1130.

The drive transmission part 220 located at the other end of the input shaft 200 can be configured such that the rotational force of the torsion bar 1130 can be applied to the drive transmission part 220, and the driving force applied to the drive transmission part 220 can rotate the outer shaft 300 through the rotation transmission parts 210. For example, the torsion bar 130 is configure to transmit driving force that may rotate the input shaft 200, and the plurality of lockers 40 is configured to come into surface contact with the flat surfaces of the outer shaft 300 in response to the rotational force of the input shaft 200.

The input shaft 200 can include the rotation transmission parts 210 inserted into the openings 410 formed in the respective lockers 400, and in an embodiment of the present disclosure, the input shaft 200 may include four rotation transmission parts 210 corresponding to the four lockers 400, and each rotation transmission part 210 may maintain a state of being inserted into the opening 410 formed in a corresponding one of the plurality of lockers 400. The rotation transmission parts 210 can be rotated in the same direction as the rotating direction of the drive transmission part 220, and the lockers 400 that come into contact with the rotation transmission parts 210 through the openings 410 can be configured to be rotated integrally in response to the rotating direction of the input shaft 200.

A braking unit 600 located in the clutch housing 100 can be configured to regulate movement of the plurality of lockers 400 if the rotational force of the outer shaft 300 is applied to the inside of the clutch 10, and can be configured such that the rotational force of the outer shaft 300 is not transmitted to the input shaft 200. The braking unit 600 of an embodiment of the present disclosure can include magnetic parts 440 located on the outermost regions of the lockers 400, a steel part 500 located on the inner circumferential surface of the clutch housing 100 to be provided at a position corresponding to the magnetic parts 440, and a braking part 510 provided adjacent to the steel part 500 so as to selectively come into contact with the lockers 400.

Because the steel part 500 can be provided on the inner circumferential surface of the clutch housing 100 and the magnetic part 440 can be provided on the outer circumferential surface of at least one locker 400, if the rotational force of the input shaft 200 is released, the magnetic parts 440 of the lockers 400 can be moved to positions close to the inner circumferential surface of the clutch housing 100. Because the braking part 510 is provided adjacent to the steel part 500 to be located close to the inner circumferential surface of the clutch housing 100, the outer circumferential surfaces of the lockers 400 can be moved to positions in contact with the braking part 510 by magnetic force, thereby restricting movement of the input shaft 200.

If the rotational force of the input shaft 200 is applied, the inner ends of the lockers 400 may come into contact with the flat surfaces formed on the outer shaft 300, so that the lockers 400 may be spaced from the inner circumferential surface of the clutch housing 100 by a designated distance and thus the input shaft 200, the lockers 400, and the outer shaft 300 may be rotated integrally without interference with the inner circumferential surface of the clutch housing 100.

If the rotational force of the outer shaft 300 is applied, the flat surfaces of the outer shaft 300 may push the plurality of lockers 400 in a radial direction so that the outer circumferential surfaces of the lockers 400 come into contact with the braking part 510 located on the inner circumferential surface of the clutch housing 100 and are fixed. Therefore, the rotational force of the outer shaft 300 may be prevented from being transmitted to the input shaft 200. For example, the braking part 510 may be formed at a position relatively closer to the lockers 400 than the steel part 500 so as to prevent the magnetic parts 440 of the lockers 400 from coming into direct contact with the steel part 500.

That is, if rotational force is applied from the vehicle height adjustment unit 2000 to the clutch 10, the clutch 10 of an embodiment of the present disclosure may restrict movement of the outer shaft 300 through the braking unit 600, thereby being capable of providing a function of self-locking the lower spring seat 4200.

In contrast, if the input shaft 200 coupled to the torsion bar 1130 is rotated, each of the rotation transmission parts 210 of the input shaft 200 may be located to come into contact with one end of the opening 410 in the width direction of a corresponding one of the lockers 400, and apply rotational force so that each of the lockers 400 is rotated in the direction of the rotational force of the torsion bar 1130. In such state, the plurality of lockers 400 can be located to come into contact with the flat surfaces of the outer shaft 300, so that a gap between the inner circumferential surface of the clutch housing 100 and the outer circumferential surfaces of the lockers 400 is maximized. Therefore, in response to the rotation of the input shaft 200, the lockers 400 can be located in a state of generating no reaction force with the clutch housing 100 and restraining the outer shaft 300 by surface contact.

Therefore, if the rotational force of the torsion bar 1130 is applied to the clutch 10, the rotation transmission parts 210 coupled to the drive transmission part 220 of the input shaft 200 and located in the openings 410 of the respective lockers 400 can initially press the openings 410 in the rotating direction of the input shaft 200.

The pressed openings 410 can move the plurality of lockers 400 so that the outer surfaces of the lockers 40 become spaced apart from the braking part 510 of the clutch housing 100, and the plurality of lockers 400 are spaced apart from the inner circumferential surface of the housing 100 and switched to a rotatable state.

In an embodiment of the present disclosure, the four rotation transmission parts 210 can be rotated in the same direction as the drive transmission part 220, and each of the rotation transmission parts 210 can come into contact with one end of a corresponding one of the openings 410 to apply rotational force in the same direction to the lockers 400.

The locker 400 can include a pressing projection 420 located at one end of locker 400, i.e., at one end of the side surface of the locker 400 close to the inner circumferential surface of the housing 100. The locker 400 including the pressing projection 420 can include an insertion groove 430 into which the pressing projection 420 of an adjacent locker 400 can be inserted. For example, the pressing projection 420 is located to intersect the insertion groove 430 in the longitudinal direction, and the lockers 400 may be configured to have the insertion grooves 430 corresponding to the pressing projections 420 and the pressing projections 420 corresponding to the insertion grooves 430 so that adjacent lockers 400 can be coupled to each other.

The plurality of lockers 400 including the pressing projections 420 and the insertion grooves 430 may be configured to be coupled to each other, and if at least one locker 400 is moved to be adjacent to the inner circumferential surface of the clutch housing 100 by the configuration of the magnetic part 440 located in the corresponding locker 400, all of the lockers 400 coupled to each other may be moved integrally.

Therefore, if the openings 410 of the lockers 400 are pressed by the rotation transmission parts 210, the pressing projections 420 of the lockers 400 are inserted into the insertion grooves 430 of the adjacent lockers 400 so that the lockers 400 are coupled to each other. That is, the pressing projections 420 press the inner surfaces of the adjacent insertion grooves 430, and the pressed lockers 400 move the adjacent lockers 400 in a direction in which they come into contact with the plurality of parallel surfaces of the outer shaft 300.

As such, if the input shaft 200 is rotated, the lockers 400 press the adjacent lockers 400 to apply force in the same direction as the rotating direction. In addition, the lockers 400 are configured to include the pressing projections 420 and the insertion grooves 430 to press the adjacent lockers 400 so that the flat surfaces of the outer shaft 300 and the inner surfaces of the adjacent lockers 400 come into contact with each other.

If rotational force is applied from the outer shaft 300 to the clutch 10, force is provided so that the lockers 400 located adjacent to the outer shaft 300 are pushed in the radial direction of the housing 100, and the lockers 400 come into contact with the braking part 510 located on the inner circumferential surface of the housing 100 so that rotation of the lockers 400 is restricted.

That is, torque due to the rotational force applied to the outer shaft 300 moves the lockers 400 in the radial direction of the housing 100, and thereby, the lockers 400 come into contact with the braking part 510. Furthermore, the movement of the lockers 400 is restricted not only by the rotational force of the outer shaft 300 but also by magnetic force formed between the magnetic parts 440 and the steel part 500. Therefore, the rotational force applied to the outer shaft 300 is offset by reaction force formed between the braking part 510 and the lockers 400, and the torque applied from the outer shaft 300 is not transmitted to the input shaft 200.

In summary, the present disclosure is configured so that the input shaft 200 transmits only rotational force in the same direction as the driving force applied from the torsion bar 1130 to the outer shaft 300, and if rotational force is applied from the outer shaft 300 to the clutch 10, the rotational force is offset by the reaction force of the lockers 400 to provide the self-locking function of the vehicle height adjustment unit 2000.

As can be apparent from the above description, an embodiment of the present disclosure may provide the following advantages through the configuration, combination, and usage relations disclosed regarding the above-described embodiments.

An embodiment of the present disclosure can provide a suspension apparatus that may control an active damper unit and a vehicle height adjustment unit with a single driving source, thereby reducing manufacturing costs and improving vehicle packaging.

An embodiment of the present disclosure can provide a suspension apparatus that may perform the self-locking function of a lower spring seat even if driving force applied to the lower spring seat is blocked, thereby providing an effect of reducing driving energy.

A number of embodiments have been disclosed herein. It can be understood that various features of the different embodiments can be combined.

The above detailed description is illustrative of some example embodiments of the present disclosure. The above description is intended to illustrate the example embodiments of the present disclosure, and parts of the present disclosure may be used in various other combinations, modifications, and environments. That is, it can be apparent to those skilled in the art that various substitutions, changes, and modifications that are not expressly exemplified herein but are still within the spirit and scopes of the present disclosure may be made. The described example embodiments illustrate a best mode for implementing the technical ideas of the present disclosure, and various changes required for specific application fields and uses of an embodiment of the present disclosure are also possible. Accordingly, the above detailed description of the present disclosure is not intended to necessarily limit the present disclosure to the disclosed example embodiments. Further, the appended claims should be construed to include other embodiments and equivalents thereof as well.

What is claimed is:

1. A suspension apparatus comprising:
a knuckle configured to be connected to a wheel;
an active damper unit configured to connect the knuckle to a body;
a first motor configured to apply rotational force to the active damper unit;
a first reducer located between the active damper unit and the first motor configured to transmit the rotational force of the first motor to the active damper unit; and
a height adjustment unit connected to the first reducer,
wherein the first reducer is configured to transmit the rotational force of the first motor to the active damper unit and the height adjustment unit via the first reducer.

2. A suspension apparatus comprising:
a knuckle configured to be connected to a wheel;
an active damper unit configured to connect the knuckle to a body;
a first motor configured to apply rotational force to the active damper unit;
a first reducer located between the active damper unit and the first motor configured to transmit the rotational force of the first motor to the active damper unit; and
a height adjustment unit connected to the first reducer,
wherein the first reducer includes a planetary gear set.

3. The suspension apparatus of claim 2, wherein the active damper unit comprises:
a rod having one end fixed to the body;
a first ball nut provided at a remaining end of the rod;
a first ball screw coupled to the first ball nut and configured to receive the rotational force of the first motor; and
a case fixed to the knuckle and configured to support the rod and the first ball screw while surrounding at least part of the rod and at least part of the first ball screw so as to be rotatable relative to the rod and the first ball screw.

4. The suspension apparatus of claim 3, wherein the rod has a space formed therein so that at least part of the first ball screw is located in the space.

5. The suspension apparatus of claim 3, further comprising:
a rebound stopper provided within the case and configured to restrict upward movement of the rod in a height direction; and
a bump stopper provided within the case and configured to restrict downward movement of the rod in the height direction.

6. The suspension apparatus of claim 3, further comprising a second reducer coupled to a carrier of the planetary gear set and configured to transmit the rotational force of the first motor to the first ball screw.

7. The suspension apparatus of claim 6, further comprising a housing fixed to the case to rotatably support the planetary gear set and the second reducer.

8. The suspension apparatus of claim 3, further comprising:

a fourth reducer coupled to the first ball nut; and a second damper or second motor connected to the fourth reducer.

9. The suspension apparatus of claim 2, wherein an output shaft of the first motor is connected to a sun gear of the planetary gear set.

10. The suspension apparatus of claim 9, further comprising a first damper connected to the sun gear of the planetary gear set by penetrating the first motor.

11. The suspension apparatus of claim 2, wherein height adjustment unit comprises:

a torsion bar having one end connected to a ring gear of the planetary gear set;

a clutch or latch solenoid connected to a remaining end of the torsion bar;

a third reducer connected to the clutch or the latch solenoid;

a second ball screw coupled to the third reducer and supported by the active damper unit so as to be rotatable with respect to the active damper unit and restrained in a vertical direction;

a second ball nut coupled to the second ball screw;

a lower spring seat fixed to the second ball nut;

an upper spring seat configured to be fixed to the body; and a spring provided between the lower spring seat and the upper spring seat.

12. The suspension apparatus of claim 11, wherein the clutch or the latch solenoid is configured to selectively connect the remaining end of the torsion bar to the third reducer, or to fix the remaining end of the torsion bar.

13. The suspension apparatus of claim 12, wherein the clutch is configured to connect the remaining end of the torsion bar to the third reducer only if a first torque of the torsion bar due to the rotational force of the first motor is greater than a second torque transmitted to the third reducer by a load of the spring.

14. The suspension apparatus of claim 13, wherein the suspension apparatus is configured such that, if the clutch connects the remaining end of the torsion bar to the third reducer so that the second ball screw is rotated, the lower spring seat is moved in an upward direction.

15. The suspension apparatus of claim 12, wherein the clutch is configured to fix the remaining end of the torsion bar if a first torque of the torsion bar due to the rotational force of the first motor is smaller than a second torque transmitted to the third reducer by a load of the spring.

16. The suspension apparatus of claim 11, wherein an upper end of the torsion bar is rotatably supported by the active damper unit; and wherein the clutch or the latch solenoid and the first motor are fixed to the active damper unit.

17. The suspension apparatus of claim 11, wherein the ring gear of the planetary gear set and the one end of the torsion bar are connected by a belt.

18. A vehicle comprising:

a vehicle body;

a spring, wherein a first spring end is fixed relative to the vehicle body;

a rod, wherein is a first rod end is fixed relative to the vehicle body;

an active damper adjustably coupled to a second rod end of the rod;

a height adjustment device adjustably coupling the active damper to a second spring end of the spring;

a first motor; and a first reducer coupled between the active damper and the first motor such that a rotational force of the first motor can be transmitted to the active damper via the first reducer, wherein the first motor is also coupled to the height adjustment device via the first reducer, such that the first motor can selectively drive adjustments of the active damper and the height adjustment device.

19. The vehicle of claim 18, wherein the height adjustment device comprises a clutch device configured to selectively connect the rotational force of the first motor to other components of the height adjustment device.

20. The vehicle of claim 18, wherein the first reducer comprises a planetary gear set, wherein the height adjustment device comprises:

a torsion bar having one end connected to a ring gear of the planetary gear set;

a clutch or latch solenoid connected to a remaining end of the torsion bar;

a third reducer connected to the clutch or the latch solenoid;

a second ball screw coupled to the third reducer and supported by the active damper so as to be rotatable with respect to the active damper and restrained in a vertical direction;

a second ball nut coupled to the second ball screw;

a lower spring seat fixed to the second ball nut, wherein the lower spring seat retains the second spring end of the spring; and an upper spring seat configured to be fixed to the vehicle body and retains the first spring end of the spring.

* * * * *